No. 729,580. PATENTED JUNE 2, 1903.
F. HARTMANN.
APPARATUS FOR THE LATERAL DELIVERY OF GOODS, &c.
APPLICATION FILED DEC. 1, 1902.
NO MODEL.
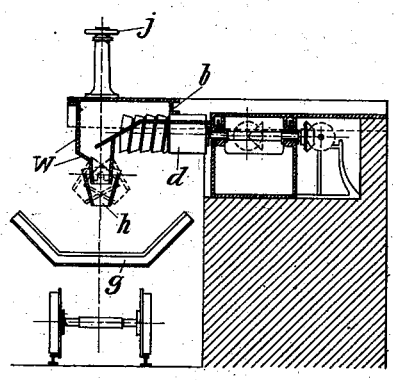
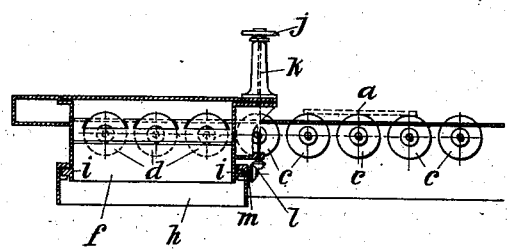
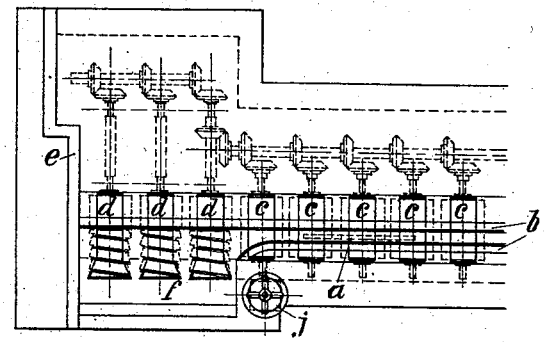
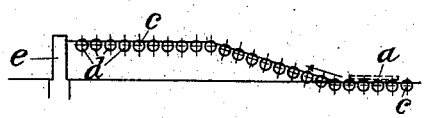
Witnesses:
Inventor:
Friedrich Hartmann.
by B. Singer, atty.

No. 729,580. Patented June 2, 1903.

UNITED STATES PATENT OFFICE.

FRIEDRICH HARTMANN, OF BERGISCH-GLADBACH, GERMANY.

APPARATUS FOR THE LATERAL DELIVERY OF GOODS, &c.

SPECIFICATION forming part of Letters Patent No. 729,580, dated June 2, 1903.

Application filed December 1, 1902. Serial No. 133,505. (No model.)

*To all whom it may concern:*

Be it known that I, FRIEDRICH HARTMANN, workmaster, a citizen of the German Empire, residing at Bergisch-Gladbach, in the Rhineland, Prussia, Germany, have invented a new and useful Improved Apparatus for the Lateral Delivery of Goods from Roller Conveyers and for Stacking Said Goods, of which the following is a specification.

There has been a long-felt want in rolling-mills for an arrangement for delivering the rolled products automatically laterally from the roller conveyers, by which the product is carried from the mill. Where trucks and the like have been made use of, an automatic lateral delivery cannot be had, as in most of these cases extra attendance is required and other inconveniences are present which are removed by the present invention.

In order to explain the apparatus, an example from practice is illustrated in the annexed drawings, showing the improved apparatus.

Figure 1 represents an end elevation, partly in section, of my apparatus; Fig. 2, a side view, and Fig. 3 a plan. Fig. 4 is a diagram of a modification on a smaller scale.

The rolled product $a$ is carried by a roller conveyer composed of rolls $c$ and is guided longitudinally by means of the guide-bars $b$. It thus moves onto the equally-rotary rolls $d\ d$, provided with screw-threads, and is carried against the abutment $e$. Being unable to move farther forward, the forward thrust against $e$ causes the product $a$ to glide laterally along the threads into the hopper $f$. This operation can also be best demonstrated by the analogy of a screw with nut on it set in motion. If the latter is prevented from taking part in the turning by holding it firm with a key or by hand, a displacement of the nut on the screw will take place. In this case the roller represents the screw and the product the nut. A lateral displacement will take place as soon as the product is kept firm—that is to say, abuts against $e$. When the product has arrived in the hopper $f$, it obtains the correct position on the truck $g$ by striking against and rolling down the wall $w$ of the truck. The product can then be removed from the truck for further working. The delivery-guide $h$ effects the equal dividing or stacking of the product on the truck. It is turnable around the pivots $i$ up to the positions shown in dotted lines. The adjustment is effected by the hand-wheel $j$. The latter is keyed onto the vertical shaft $k$ and acts upon the part $h$ through the beveled wheels $l$. Of these one each is keyed on the vertical shaft $k$ and the pivot $m$, which latter is cast onto the part $h$.

With this arrangement the product can be delivered to the right or to the left, according as the rollers are cut with right or left handed thread. With this apparatus a horizontal as well as an upward or downward displacement can also be effected, according as a horizontal or upwardly and downwardly inclined plane is laterally arranged. In the apparatus shown on drawings a downward method is represented.

The rollers $d$ instead of being horizontal can also be inclined at an angle in order to deliver the product from an elevated position.

Having now particularly described and ascertained the nature of my said invention and in what manner the same is to be performed, I declare that what I claim is—

1. In a conveying apparatus, the combination with a plurality of parallel plain rolls, of a plurality of spirally-grooved rolls, arranged adjacent one end of the first series of rolls, a hopper arranged adjacent the last-named rolls, and means for rotating both series of rolls simultaneously.

2. In a conveying apparatus, the combination with a plurality of plain rolls, a plurality of spirally-grooved rolls arranged adjacent one end of said plain rolls, of a casing surrounding both sets of rolls, one wall of said casing being parallel to the said spiral rolls, and acting as an abutment for the material traveling on said rolls, and means for working both series of rolls simultaneously.

3. In a conveying apparatus, the combination with a plurality of plain rolls, a plurality of spirally-grooved rolls; of a casing surrounding both series of rolls, a hopper located beneath said spiral rolls, and means for simultaneously working both series of rolls.

4. In a conveying apparatus, the combination with a plurality of plain rolls, a plurality of spirally-grooved rolls, guides mounted on said rolls, of a casing enveloping both series of rolls, a hopper connected to said casing and located beneath said spirally-grooved rolls, and an adjustable guide pivotally secured to said hopper.

In witness whereof I have hereunto set my hand in presence of two witnesses.

FRIEDRICH HARTMANN.

Witnesses:
CARL SCHMITT,
JOH. SCHOLZ.